US006977385B2

(12) United States Patent
Struye et al.

(10) Patent No.: US 6,977,385 B2
(45) Date of Patent: Dec. 20, 2005

(54) STORAGE PHOSPHOR SCREEN HAVING BINDERLESS COLORED LAYERS

(75) Inventors: Luc Struye, Mortsel (BE); Paul Leblans, Kontich (BE)

(73) Assignee: Agfa-Gevaert, Mortsel (BE)

( * ) Notice: Subject to any disclaimer, the term of this patent is extended or adjusted under 35 U.S.C. 154(b) by 292 days.

(21) Appl. No.: 10/369,404

(22) Filed: Feb. 19, 2003

(65) Prior Publication Data

US 2003/0183777 A1    Oct. 2, 2003

Related U.S. Application Data

(60) Provisional application No. 60/370,652, filed on Apr. 8, 2002.

(30) Foreign Application Priority Data

Mar. 26, 2002    (EP)    .................... 02100296

(51) Int. Cl.$^7$ ........................ H05B 33/00; A61B 6/00; G01N 23/04; G03C 1/06; G03C 1/815
(52) U.S. Cl. .................... 250/484.4; 250/582; 430/517
(58) Field of Search .................... 250/483.1, 484.4, 250/486.1, 367, 487.1; 976/DIG. 439; 428/690; 427/69–70; 430/517

(56) References Cited

U.S. PATENT DOCUMENTS

| 3,862,127 A |   | 1/1975  | Miller et al. ............. 260/314.5 |
|---|---|---|---|
| 4,059,768 A | * | 11/1977 | Van Landeghem et al. ........................ 250/483.1 |
| 4,394,581 A |   | 7/1983  | Takahashi et al. ........ 250/484.1 |
| 4,491,736 A |   | 1/1985  | Teraoka .................... 250/484.1 |
| 4,675,271 A |   | 6/1987  | Degenhardt ................. 430/139 |
| 4,879,202 A |   | 11/1989 | Hosoi et al. ................ 430/139 |
| 4,947,046 A | * | 8/1990  | Kawabata et al. ......... 250/484.4 |
| 5,153,759 A | * | 10/1992 | Haas et al. .................... 349/29 |
| 5,338,926 A | * | 8/1994  | Yoshida ................. 250/214 VT |
| 5,401,971 A |   | 3/1995  | Roberts .................... 250/484.4 |
| 5,483,081 A | * | 1/1996  | Hosoi ......................... 250/585 |
| 5,502,465 A | * | 3/1996  | Agano ......................... 347/264 |
| 5,877,508 A | * | 3/1999  | Arakawa et al. ............ 250/588 |
| 6,420,724 B1 | * | 7/2002  | Struye et al. ............... 250/585 |

(Continued)

FOREIGN PATENT DOCUMENTS

DE           30331267         3/1982

(Continued)

OTHER PUBLICATIONS

Pigment Identification Chart. Datasheet [online]. Golden Artist Colors, Jun. 17, 2005 [retrieved on Jul. 14, 2005]. Retrieved from the Internet: <URL: http://www.goldenpaints.com/technicaldata/pigment.php>.*
European search Report, EP 02100296, Jul. 15, 2002.

*Primary Examiner*—David Porta
*Assistant Examiner*—Frederick F. Rosenberger
(74) *Attorney, Agent, or Firm*—Joseph T. Guy; Nexsen Pruet, LLC

(57) ABSTRACT

A layer arrangement comprising, at least in a binderless layer thereof, one or more vapor deposited pigments like the preferred nanocrystalline β-Cu-phthalocyanine nanocrystalline dye compound has been disclosed, wherein said layer arrangement is, in a preferred embodiment a photostimulable phosphor plate or panel having a binderless needle-shaped photostimulable alkali metal phosphor, and, more preferably, a CsBr:Eu$^{2+}$ phosphor, showing besides a high image definition, an excellent preservation of color stability; and wherein the thus produced binderless photostimulable phosphor screen is overcoated with a strong protective layer in order to provide ability for easy transport through a scanning module, without jamming, in a diagnostic radiographic image reading system.

40 Claims, 7 Drawing Sheets

U.S. PATENT DOCUMENTS

| | | | |
|---|---|---|---|
| 6,486,477 B1 | 11/2002 | Suzuki et al. | 250/483.1 |
| 6,707,050 B2 * | 3/2004 | Hosoi | 250/484.4 |
| 6,802,991 B2 * | 10/2004 | Devenney et al. | 252/301.4 H |
| 6,815,092 B2 * | 11/2004 | Van den Bergh et al. | 428/690 |
| 2002/0079458 A1 * | 6/2002 | Zur | 250/370.11 |

FOREIGN PATENT DOCUMENTS

| | | | |
|---|---|---|---|
| EP | 0 209 358 | 1/1987 | |
| EP | 0 351 176 | 1/1990 | |
| EP | 0 393 662 | 10/1990 | |
| EP | 0 595 089 | 5/1994 | |
| EP | 0 866 469 | 9/1998 | |
| EP | 1 113 458 | 7/2001 | |
| EP | 1 286 362 | 2/2003 | |
| EP | 1 286 363 | 2/2003 | |
| EP | 1 286 364 | 2/2003 | |
| EP | 1 286 365 | 2/2003 | |
| EP | 1 316 972 | 6/2003 | |
| EP | 1316969 A1 * | 6/2003 | G21K 4/00 |
| EP | 1316970 A1 * | 6/2003 | G21K 4/00 |
| EP | 13494177 A2 * | 10/2003 | G21K 1/06 |

* cited by examiner

STORAGE PHOSPHOR SCREEN HAVING BINDERLESS COLORED LAYERS

The application claims the benefit of U.S. provisional application No. 60/370,652 filed Apr. 8, 2002.

FIELD OF THE INVENTION

The present invention relates to layers and layer arrangements present on a substrate and more in particular to a colored binderless storage phosphor screen with vapor deposited photostimulable phosphors.

BACKGROUND OF THE INVENTION

A well known use of radiation image storage phosphors is in the production of X-ray images. In U.S. Pat. No. 3,859,527 a method for producing X-ray images with a photostimulable phosphor, which are incorporated in a panel is disclosed. The panel is exposed to incident pattern-wise modulated X-ray beam and as a result thereof the phosphor temporarily stores energy contained in the X-ray radiation pattern. At some interval after the exposure, a beam of visible or infra-red light scans the panel in order to stimulate the release of stored energy as light that is detected and converted to sequential electrical signals which are processed in order to produce a visible image. For this purpose, the phosphor should store incident X-ray energy in an amount as much as possible and emit stored energy in a negligible amount before being stimulated by the scanning beam. This is called "digital radiography" or "computed radiography".

Since in the above described X-ray recording systems the X-ray conversion screens are repeatedly used, it is important to provide them with an adequate topcoat for protecting the phosphor containing layer from mechanical and chemical damage. This is particularly important for photostimulable radiographic screens where screens are often transported in a scanning module—wherein the stimulation of the stored energy takes place—while not being not encased in a cassette but used and handled as such, without protective encasing. A protective layer can be coated onto the phosphor containing layer by directly applying thereto a coating solution containing a film-forming organic solvent-soluble polymer such as nitrocellulose, ethylcellulose or cellulose acetate or poly(meth)acrylic resin and removing the solvent by evaporation. According to another technique a clear, thin, tough, flexible, dimensionally stable polyamide film is bound to the phosphor layer as described in EP-A 0 392 474. According to still another well-known technique a protective overcoat is produced with a radiation-curable composition, e.g. by making use of a radiation curable coating as protective top layer in a X-ray conversion screen as described in EP-A 0 209 358, in JP-A 61/176900 and in U.S. Pat. No. 4,893,021. So in U.S. Pat. No. 6,120,902 an intensifying screen is disclosed carrying a radiation cured protective layer and having a determined unevenness. U.S. Pat. No. 4,059,768 further illustrates use of polymeric beads containing fluoro-moieties in intensifying screens in order to have screens with good transportability. In U.S. Pat. No. 5,401,971 storage phosphor screens are disclosed comprising a protective layer coated from a solution, in butanone, of a miscible blend of poly(vinylidene fluoride-co-tetrafluoroethylene) and poly(1 to 2 carbonalkyl)-methacrylate.

More recently as more particular screens yielding X-ray images with good quality should have an increased physical strength in order to be transported in a scanner without risk of jamming, further withstanding wear and tear of transporting, with no or low risk for electrical charging, provisions have been taken as set forth in EP-Application No. 01 000 694, filed Dec. 3, 2001, wherein said protective layer is radiation cured.

In order to provide moistureproof use and processing of phosphor screens or panels suitable for use in radiation detectors, said detectors are advantageously overcoated with a moistureproof protective layer, provided thereupon by chemical vapor deposition, just as needle-shaped crystals have advantageously been deposited. More preferably said radiation detector is a phosphor screen, i.e. an intensifying screen or a storage phosphor screen or panel, wherein, in a further preferred embodiment, said phosphor screen is a needle storage phosphor screen, and wherein said moistureproof protective layer is a "Parylene" (poly-p-xylylene) layer as disclosed in EP-A's 1 286 362, 1 286 363, 1 286 364 and 1 286 365.

As a further development described e.g. in U.S. Pat. No. 3,859,527 an X-ray recording system is disclosed wherein photostimulable storage phosphors are used that, in addition to their immediate light emission (prompt emission) on X-ray irradiation, have the property to store temporarily a large part of the energy of the X-ray image which energy is set free by photostimulation in the form of light different in wavelength characteristic from the light used in the photostimulation. In said X-ray recording system the light emitted on photostimulation is detected photo-electronically and transformed in sequential electrical signals. Basic constituents of such X-ray or radiographic imaging system operating with storage phosphors are an imaging sensor containing said phosphor, normally a plate or panel, which temporarily stores the X-ray energy pattern, a scanning laser beam for photostimulation, a photo-electronic light detector providing analog signals that are converted subsequently into digital time-series signals, normally a digital image processor which manipulates the image digitally, a signal recorder, e.g. magnetic disk or tape, and an image recorder for modulated light-exposure of a photographic film or an electronic signal display unit, e.g. a cathode ray tube.

A survey of lasers useful in the read-out of photostimulable latent fluorescent images is given in the periodical Research Disclosure Volume 308 No. 117 p. 991, 1989.

From the preceding description it is clear that said X-ray plates or panels only serve as intermediate imaging elements and do not form the final record. The final image is made or reproduced on a separate recording medium or display. The phosphor plates or sheets can be repeatedly re-used, provided that before re-use of the photostimulable phosphor panels or sheets a residual energy pattern is erased by flooding with light.

Besides stringent mechanical requirements set out hereinbefore image quality of the image storage panels, exceptionally severe demands should be fulfilled, especially with respect to image definition, i.e., sharpness. The sharpness does not depend upon the degree of spread of the light emitted by the stimulable phosphor in the panel, but depends on the degree of spread of the stimulable rays in the panel: in order to reduce this spread of light a mixture can be made of coarser and finer batches in order to fill the gaps between the coated coarser phosphor particles. A better bulk factor may be attained by making such a mixture, resulting in a loss in sensitivity unless the phosphor grains are only slightly different in sensitivity. For intensifying screens this topic has already be treated much earlier by Kali-Chemie and has been patented in U.S. Pat. Nos. 2,129,295; 2,129,296 and 2,144,040. Otherwise reduction of graininess is also strived at and can be realized, e.g. by providing a layer arrangement wherein the protective layer is unsharply depicted as disclosed in DE-A 3031267. Phosphor layer thickness may further give rise to increased unsharpness of the emitted light. This is more unfavourable when the weight ratio between the amount of phosphor particles and the amount of binder decreases for the same coating amount of said phosphor particles. Enhancing the weight ratio amount of phosphor to binder in order to provide sharper images, by decreasing the amount of binder, leads to unacceptable manipulation characteristics of the screen due to e.g. insufficient elasticity and brittleness of the coated phosphor layer in the screen. One way in order to get thinner coated phosphor layers without changing the coated amounts of pigment and of binder makes use of a method of compressing the coated layer containing both, binder and phosphor, at a temperature not lower than the softening point or melting point of the thermoplastic elastomer as has been described in EP-A 0 393 662. Another way free from compression manufacturing techniques has been proposed in PCT-filing WO 94/0531, wherein the binding medium comprises one or more rubbery and/or elastomeric polymers providing improved elasticity of the screen, high protection against mechanical damage, high ease of manipulation, high pigment to binder ratio and an improved image quality, especially sharpness.

Radiographs obtained from the well-known intensifying screen generation showing improved visualisation therefore comprise, more particularly in favour of sharpness, a blue-light absorbing, complementary yellow dye, as described e.g. in EP-A 0 028 521. Early references referring to the improvement of sharpness of radiation image storage panels, related with the addition of a colorant to the panels, as in U.S. Pat. No. 4,394,581, take into account that a dye or colorant is added to the panel so that the mean reflectance of said panel in the wavelength region of the stimulating rays for said stimulating phosphor is lower than the mean reflectance of said panel in the wavelength region of the light emitted by said photostimulable phosphor upon stimulation thereof. In U.S. Pat. No. 4,491,736 more specifically an organic colorant is disclosed which does not exhibit light emission of longer wavelength than that of the stimulating rays when exposed thereto. EP-A 0 165 340 and the corresponding U.S. Pat. No. 4,675,271 disclose a storage phosphor screen showing a better image definition by incorporation of a dye. An analoguous effect brought about in phosphor layers of image storage panels by incorporation of dyes or colorants has further been described in EP-A 0 253 348 and the corresponding U.S. Pat. No. 4,879,202 and in EP-A 0 288 038. In favour of sharpness of radiation image storage panels colored with a colorant so that the mean reflectance of said panel in the wavelength region of the stimulating rays for the photostimulating phosphor present in its storage phoshor layer is lower than the mean reflectance of said panel in the wavelength region of the light emitted by said photostimulable phosphor upon stimulation thereof, a triarylmethane dye having at least one aqueous alkaline soluble group was selected, wherein said dye should be present in at least one of said support, said phosphor layer or an intermediate layer between said support and said phosphor layer as disclosed in EP-A 0 866 469 and the corresponding U.S. Pat. No. 5,905,014. In case wherein an antihalation undercoat layer is present in the panel between the phosphor layer and a support having reflective properties, a layer arrangement of intermediate layers is preferred in order to get an optimized relationship between mechanical characteristics, speed and sharpness: an intermediate layer arrangement between (subbed) support and phosphor layer substantially consisting of an antihalation undercoat layer containing one or more dye(s), wherein said layer is situated more close to said support, and an adhesion improving layer situated more close to the said layer of storage phosphor particles, and wherein said adhesion improving layer is hardened to a lesser extent than said antihalation undercoat layer, is highly recommended as has been illustrated in EP-Application No. 02 100 195, filed Feb. 28, 2002.

In order to obtain a reasonable signal-to-noise ratio (S/N) the stimulation light should be prevented from being detected together with the fluorescent light emitted on photostimulation of the storage phosphor which should reach the detector. Therefore a suitable filter means should be used preventing the stimulation light from entering the detecting means, e.g. a photomultiplier tube. Because the intensity ratio of the stimulation light is markedly higher than that of the stimulated emission light, i.e. differing in intensity in the range of $10^4:1$ to $10^6:1$ (see published EP-A 0 007 105, col. 5) a very selective optical filter should be mounted between the phosphor plate and the detector. Suitable filter means or combinations of filters may be selected from the group of cut-off filters, transmission bandpass filters and band-reject filters. A survey of filter types and spectral transmittance classification is given in SPSE Handbook of Photographic Science and Engineering, Edited by Woodlief Thomas, Jr.—A Wiley-Interscience Publication—John Wiley & Sons, New York (1973), p. 264–326. In praxis a useful filter should absorb red laser light (generated by a laser source, used as stimulating light source) and be transparent for blue light, emitted upon stimulation. Most preferred filters are made of colored glass, but a disadvantage is its thickness. Even after optimisation a filter composed of dielectric layers has a minimum thickness of 2.5 mm at least. Most preferably the thickness of the optical filter should be minimized in order to increase collection efficiency by the detector: a higher collection efficiency indeed enhances the number of detected quanta, thereby improving the signal-to-noise ratio (SNR).

Otherwise the collection efficiency highly depends on the distance between storage phosphor screen or panel and detector. A smaller distance provides a higher collection efficiency. Optical means providing high collection efficiency, such as a Fiber Optic Plate or "FOP" can only be applied in combination with a very thin filter (as long as no very thin filter was available those techniques could e.g. not be applied).

In the past decades quite a lot of research has been performed in order to produce very thin optical filters, based on use of suitable dyes or colorants, absorbing radiation in the desired wavelength range. Burden has until now frequently been laid upon photochemical stability of such dyes. Therefor it remains an ever lasting demand to further direct investigations related with improvement of sharpness.

From a point of view of phosphor morphology or structuration in a phosphor layer, more particularly related with measures improving sharpness, needle-shaped phosphors present in binderless layers are particularly suitable for use in flat scanner plates. For screens having been coated from hydrophilic coating solutions, there is no problem when further measures are taken in favour of sharpness, related with respect to the selection of a dye, provided that, besides suitable radiation absorption properties, the dye has a hydrophilic moiety in its structure, and that a perfect resistance to degradation under the influence of radiation and bleaching phenomena as well is guaranteed. More questionable however is the selection of dyes with hydrophobic moieties, more particularly when hydrophilic moieties should be avoided as coating should be performed in non-aqueous coating solutions, preferred as in cases wherein phosphor particles are particularly sensitive to moisture.

OBJECTS AND SUMMARY OF THE INVENTION

Therefore it is an object of the present invention to provide a radiation image storage panel having moisture-sensitive stimulable phosphor particles, colored with a dye, showing an excellent light-stability, wherein said panel provides an excellent image resolution.

Another object of the present invention is to look more particularly for a dye providing ability to color the moisture-sensitive stimulable phosphor layer with a dye from an aqueous- or moisture-free medium.

More particularly it is an object of the present invention to provide a binderless stimulable phosphor screen useful in an X-ray recording system having an excellent sharpness, preserved in view of color stability and moisture stability.

Besides these objects the said screen should have a strong protective layer in order to provide ability for easy transport through a scanning module without causing jamming.

Still another object of the present invention is to provide a layer or layer arrangement wherein such a dye is suitable for use, and wherein use as a filter dye in a very thin optical filter is envisaged, wherein the absorption spectrum of the said dye matches the absorption spectrum from the dye in the colored phosphor layer.

Other objects and advantages will become clear from the following description and examples.

In accordance with the present invention the above mentioned object has been realized by providing a layer arrangement having the specific features as defined in claim 1, and, more particularly, wherein said layer arrangement is in form of a photostimulable binderless phosphor screen.

Specific features for preferred embodiments of the invention are disclosed in the dependent claims.

Further advantages and embodiments of the present invention will become apparent from the following description and drawings.

DETAILED DESCRIPTION OF THE INVENTION

Figure 1:
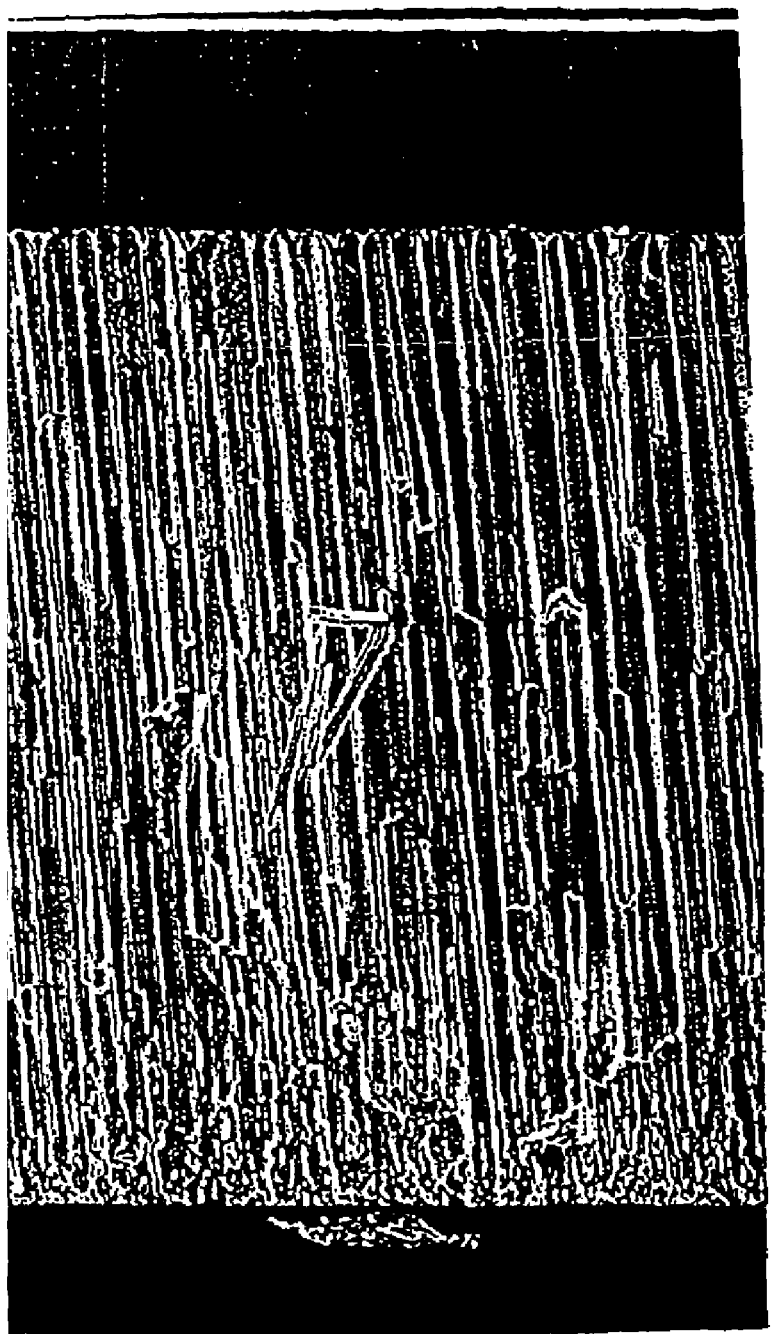
FIG. 1 shows a SEN photograph of a phosphor screen with needle-shaped phosphor.

A lot of research has been performed in order to select a class of dyes providing, unexpectedly, coatability in a thin optical filter layer, wherein the absorption spectrum of the said dye matches the absorption spectrum of the same dye when present in a colored phosphor layer. Cyanine dyes forming complexes with copper have been shown to provide such desired compromise in order to is attain excellent properties.

So photochemical stability has been found to be provided by copper-sulphonated phthalocyanine dyes, moreover providing coating ability from aqueous solutions, and, as a consequence, coatability from aqueous gelatinous solutions as desired in most classical photographic applications. Such a selected dye is e.g. particularly suitable for use in a very thin optical filter (in the range of 50 $\mu$m when coated upon an optical component) e.g. as light-stable filter layer in combination with a photomultiplier detector. Such a layer is directly coatable e.g. onto a glass substrate of said detector or coated separately before in order to be glued thereupon by means of an optical glue. In favour of adhesive properties, besides applying a glued layer, it is recommended to have an undercoat layer between substrate (support) and filter layer, wherein said undercoat layer comprises silica and in a preferred embodiment a filter layer is provided wherein silica is present. A dye compound as Cu-sulphonated phthalocyanine provides coating ability from aqueous solutions. When a transparent substrate material is coated with said selected dye a very thin light-stable optical filter suitable for use in combination with a photomultiplier detector is provided. The selected copper complex of a cyanine dye compound set forth above moreover advantageously provides an absorption spectrum matching the absorption spectrum of the said dye as such.

According to the present invention a layer or layer arrangement present on a substrate is provided, characterized in that at least one nanocrystalline dye compound(s) is present in at least one layer on a substrate thereof, and, more particularly in favour of lowering radiation scattering, in that at least one nanocrystalline dye compound is present in at least one binderless layer on the said substrate.

In a further embodiment according to the present invention a layer or layer arrangement is provided, wherein said layer having at least one nanocrystalline dye compound further comprises colloidal silica.

Research in order to make a selection of suitable dyes has indeed shown, that in a layer or layer arrangement according to the present invention a copper complex of a cyanine dye is preferred as a dye compound. In a more preferred embodiment according to the present invention it has been shown that in the said layer or layer arrangement as set forth said dye compound is a β-Cu-phthalocyanine.

In a layer arrangement as in moisture-sensitive phosphor screens or panels wherein components, free from moisture are preferably deposited by means of the vapor deposition technique as described e.g. in EP-A 1 113 458 for needle-shaped phosphors, suitable dyes should have sublimation ability. So with respect to needle-shaped phosphors suitable for use in a flat storage panel layer arrangement for direct radiography, Cu-sulphonated phthalocyanine, although providing dye stability, cannot be used as a dye, due to lack for sublimation ability of the said dye.

From laboratory experiments, in order to select a dye as desired within the scope of the present invention, it has clearly been shown that photochemical stability of dyes is excellent when the dye has a crystalline morphology. The risk to lose this particularly desired advantage increases when the dye is contacted with solvents: in a dissolved state, quite a lot of light-stability is lost indeed, as its sensitivity to become bleached tremendously increases. Ability to sublimate as a nanocrystalline dye and preserving, in the at least one binderless layer of the layer arrangement wherein it is deposited, an absorption spectrum matching the absorption spectrum of the dye, is a combination of properties where profit is advantageously taken from.

When looking for a technique in order to leave the crystalline morphology of the dye unchanged, further creating a thin homogeneous and compact layer, it has been found that such an attempt is most succesfully performed when applying the vapor-deposition technique. Ability to get such a highly desired effect has been restricted, until now, to only one specifically selected dye, resisting the high temperatures used while performing the said vapor-deposition technique, without loss in light-stability and providing an unchanged absorption spectrum and desired high absorption.

According to the present invention a layer or layer arrangement is thus provided wherein said dye compound is a copper complex of a cyanine dye, wherein from this particular class of cyanine dyes the said selected dye is β-copper phthalocyanine and according to the present invention a layer or layer arrangement is provided wherein said β-Cu-phthalocyanine dye compound is represented by its chemical formula as $CuC_{32}N_6H_{16}$. While performing the vapor-deposition technique the dye sublimates and becomes deposited onto a substrate. During deposition of the said dye nanosized crystalline particles are arranged in a layer and are further characterized by a high degree of homogeneity and a highly compact design.

According to the present invention a layer arrangement thus provides a binderless photostimulable phosphor screen having a vapor deposited phosphor layer on a substrate characterized in that at least one nanocrystalline dye compound is present in at least one binderless layer on a substrate thereof. It is thus not excluded to have said sublimated dye moreover present in other layers, besides the said binderless layer or layers.

As a particular advantage it has been observed that the optical properties of the thin dye layer perfectly matches those of the initial dye before sublimation and vapor deposition !

In order to get excellent adhesion of the vapor-deposited dye onto a substrate, more particularly onto glass as a selected substrate, the dye and $SiO_2$, known as silica, are evaporated at the same time and are forming one layer.

According to the present invention a layer or layer arrangement is thus provided, wherein said layer having at least one nanocrystalline dye compound further comprises colloidal silica.

In a preferred embodiment according to the present invention a phosphor screen comprising a binderless colored photostimulable phosphor layer is envisaged, wherein said phosphor layer is comprising of a vapor deposited alkali metal halide phosphor and a selected dye as set forth hereinbefore, in favour of obtaining an excellent image definition (sharpness).

With respect to the term "vapor deposited", it should be stressed that the preferred alkali metal halide phosphor is a needle-shaped phosphor having crystals deposited by the technique of vapor-deposition.

So by "vapor deposited phosphor" is, throughout this text, meant a phosphor that is deposited on a substrate by any method selected from the group consisting of thermal vapor deposition, chemical vapor deposition, electron beam deposition, radio frequency deposition and pulsed laser deposition. This vapor deposition is preferably carried out under conditions as described in EP-A 1 113 458.

According to the present invention a layer arrangement is thus provided representing a photostimulable phosphor screen having a binderless vapor deposited phosphor layer on the substrate, characterized in that at least one nanocrystalline dye compound is present in at least the said binderless phosphor layer on the said substrate.

Further according to the present invention said layer arrangement thus represents a photostimulable phosphor screen having a support and a binderless vapor deposited photostimulable phosphor layer with phosphor needles and voids between said needles, characterized in that said voids between said needles are partially filled with the said nanocrystalline dye.

In a preferred embodiment according to the present invention said layer arrangement comprises a photostimublable phosphor layer wherein the photostimulable phosphor layer is a binderless layer composed of a vapor deposited alkali metal halide phosphor.

When vapor deposited phosphor layers are containing needle-shaped phosphors separated by voids as disclosed in, e.g., the above mentioned EP-A 1 113 458, the phosphor layer is quite sensitive for mechanical impact. It has been found now that, according to the present invention, simultaneous vapor deposition of the selected dye mentioned above, together with the phosphor, provides filling of the voids inbetween the pillar- or needle-shaped phosphors. As a result the voids inbetween pillar- or needle-shaped phosphors need to be filled up further to a remarkably lower extent, if compared with the voids inbetween phosphor needles in a binderless layer of a storage phosphor panel described in EP-Application No. 02 100 235, filed Mar. 8, 2002. In the absence of a dye in the voids up to at least about 5% of the total length of such needle-shaped phosphor should indeed be filled up. Besides a strengthening effect upon the thus deposited phosphor layer, an increased sharpness is obtained due to occurrence of less scattering of the impinging radiation by stimulating rays.

Pigments or dyes are thus, at least in part, deposited in the interstices between the stimulable phosphor needle crystals together with the stimulable phosphor, provided that dye vapor deposition is possible. Therefore it is required to have a dye or pigment that is not decomposed and that optical characteristics thereof are left unchanged under the influence of increased temperatures during vapor deposition together with the storage phosphor. In such cases, the ratio (weight ratio) of the stimulable phosphor to the dye or pigment should preferably fall within the range between 1,000,000:1 and 1,000:1. In cases wherein the pigment is introduced together with the storage phosphor into the stimulable phosphor layer, a light reflecting layer reflecting the stimulating rays is advantageously formed on one surface of the stimulable phosphor layer.

Further examples of dyes suitable for use within the scope of the present invention are Methylene Blue ($C_{16}H_{18}ClN_3$), Azure B ($C_{15}H_{17}ClN_3S$), Toluidine Blue 0 ($C_{15}H_{16}N_3SCl$), Thionin ($C_{12}H_{10}ClN_3S$) Indocyanine Green (IGC) ($C_{43}H_{47}N_2O_6S_2Na$), Magnesium Phthalocyanine, Oxatricarbocyanine, Indotricarbocyanine, Zinc Phthalocyanine, Oxazine, Cryptocyanine and Tetra-1-butyl-naphthalocyanine, but as most preferred pigment dye β-copper phthalocyanine ($CuC_{32}N_6H_{16}$) has been selected, as being the chemically most stable dye in the series mentioned above.

According to the present invention coating of very thin, homogeneously colored layers is attained, without undesired gaps inbetween the needle-shaped phosphor crystals. As the preferred pigment dye is blue colored a very good absorption of red laser stimulation radiation and a very good transmission of blue stimulated light is guaranteed. Said selected β-copper phthalocyanine is, as a preferred dye, available from Ciba-Geigy, Switzerland.

According to the present invention the storage phosphor plate or panel preferably comprises one or more dyes as set forth above in an amount of from 1 $\mu g/m^2$ up to 1000 $\mu g/m^2$.

The phosphor layer of the binderless storage phosphor screen according to the present invention is, besides preferably being prepared by chemical vapor deposition of the storage phosphor crystals on the substrate, prepared in the alternative by combining (mixing) the ingredients for the storage phosphor (phosphor precursors) and then evaporating this mixture in order to have the phosphor formed in situ during evaporation.

The storage phosphor in a binderless storage phosphor screen according to the present invention, however in principle being any storage phosphor known in the art, preferably is an alkali metal phosphor phosphor, which is particularly suitable for use in a binderless storage phosphor screen of the present invention.

Radiation image storage screens comprising and alkali metal halide phosphor wherein the dopant is selected from the group consisting of Ga1+, Ge2+, Sn2+, Sb3+ and As3+ and wherein, in a preferred embodiment, the alkali metal is Cs and/or Rb as in EP-A 0 751 200 may advantageously be colored with a dye as described above. Suitable storage phosphors are, e.g., phosphors according to the formula (I):

$$M^{1+}X.aM^{2+}X'_2bM^{3+}X''_3:cZ \qquad (I)$$

wherein:

$M^{1+}$ is at least one member selected from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group $Ga^{1+}$, $Ge^{2+}$, $Sn^{2+}$, $Sb^{3+}$ and $As^{3+}$, X, X' and X'' can be the same or different and each represents a halogen atom selected from the group consisting of F, Br, Cl, I and $0 \leq a \leq 1$, $0 \leq b \leq 1$ and $0 < c \leq 0.2$.

Such phosphors have e.g. been disclosed in U.S. Pat. No. 5,736,069.

Highly preferred storage phosphors for use in a binderless stimulable phosphor screen of the present invention are the CsX:Eu photostimulable phosphors, described in WO 01/003156, wherein X represents a halide selected from the group consisting of Br and Cl is prepared by a method comprising as steps:

mixing said CsX with between $10^{-3}$ and 5 mole % of a Europium compound selected from the group consisting of EuX'$_2$, EuX'$_3$ and EuOX', X' being a member selected from the group consisting of F, Cl, Br and I, firing said mixture at a temperature above 450° C.
cooling said mixture and
recovering the CsX:Eu phosphor.

According to a preferred embodiment of the present invention a binderless photostimulable phosphor screen has a needle-shaped CsX:Eu phosphor, wherein X represents a halide selected from the group consisting of Br and Cl.

Most preferably a CsBr:Eu photostimulable phosphor, is used, and more particularly one prepared by a method comprising the steps of:

mixing said CsX with between $10^{-3}$ and 5 mole % of a Europium compound selected from the group consisting of EuX'$_2$, EuX'$_3$ and EuOX', X' being a member selected from the group consisting of F, Cl, Br and I, firing said mixture at a temperature above 450° C.
cooling said mixture and
recovering the CsX:Eu phosphor.

The phosphor layer of the binderless screen is advantageously prepared by bringing such finished phosphor on the support by any method selected from the group consisting of thermal vapor deposition, chemical vapor deposition, electron beam deposition, radio frequency deposition and pulsed laser deposition. It is also possible to bring the alkali metal halide and the dopant together and depositing them both on the support in such a way that the alkali metal phosphor is doped during the manufacture of the screen.

The present invention further encompasses a method for manufacturing a layer arrangement in form of a phosphor screen containing a CsX:Eu photostimulable phosphor, wherein X represents a halide selected from the group consisting of Br and Cl comprising the steps of:

bringing multiple containers of said CsX and an Europium compound selected from the group consisting of EuX'$_2$, EuX'$_3$ and EuOX', X' being a halide selected from the group consisting of F, Cl, Br and I in condition for vapor deposition and depositing, by a method selected from the group consisting of, thermal vapor deposition, chemical vapor deposition, electron beam deposition, radio frequency deposition and pulsed laser deposition, both said CsX and said Europium compound on a substrate in such a ratio that on said substrate a CsX phosphor, doped with between $10^{-3}$ and 5 mole % of Europium, is formed.

The deposition process may proceed from a single container containing a mixture of the starting compounds in the desired proportions. Thus the method encompasses further a method for manufacturing a storage phosphor screen containing a CsX:Eu photostimulable phosphor, wherein X represents a halide selected from the group consisting of Br and Cl comprising the steps of:

mixing said CsX with between $10^{-3}$ and 5 mole % of a Europium compound selected from the group consisting of EuX'$_2$, EuX'$_3$ and EuOX', X' being a halide selected from the group consisting of F, Cl, Br and I;

bringing said mixture in condition for vapor deposition and depositing said mixture on a substrate by a method selected from the group consisting of physical vapor deposition, thermal vapor deposition, chemical vapor deposition, electron beam deposition, radio frequency deposition and pulsed laser deposition.

Particularly preferred as radiation image storage phosphor in the binderless stimulable phosphor layer of the layer arrangement according to the present invention is CsBr:Eu$^{2+}$ as this particular selected phosphor provides ability to be coated by chemical vapor deposition in needle-shaped cylindrical form, in a binderless layer of a storage screen or panel.

With respect to image definition obtained from such a needle-shaped phosphor layer having the preferred CsBr:Eu$^{2+}$ storage phosphor in form of packed cylinders, it has been experimentally proved that needles having too small a cross-section did not allow radiation to pass through, whereas needles having too large diameters, although easily leaving radiation to pass through, were leading to unsharp images. Therefore needle-shaped CsBr:Eu$^2$+ storage phosphor particles in form of a cylinder were selected, said phosphor particles having an average cross-section diameter in the range from 1 $\mu$m to 30 $\mu$m, more preferably in the range from 2 $\mu$m up to 15 $\mu$m in order to provide sufficient sharpness; and an average length, measured along the casing of said cylinder, in the range from 100 $\mu$m up to 1000 $\mu$m and more preferred in the range from 100 $\mu$m up to 500 $\mu$m in order to provide enough speed.

One of the major challenges in reducing the particle size below 1 μm, lies in the precipitous decrease of the phosphor luminescence efficiency. This is attributed to the surface-related non-radiative processes that become dominant in the region between 1 μm to 0.01 μm: as a theoretical barrier the diameter should never be smaller than 440 nm, representing a realistic wavelength. A boundary value sufficiently departing therefrom is thus 1 μm.

A sufficient number of needles should further be present as otherwise the needle structure is depicted, as interference with the pixel size is not excluded. In mammography e.g. a pixel size of 60 μm is normally used, so that a diameter of 30 μm for one needle provides presence of ½ of a pixel: 4 needles are provided per pixel in that case, corresponding with a minimum as "aliasing" otherwise occurs. In a more preferred embodiment according to the present invention the needle-shaped phosphor should have an average diameter in the range from 2 μm up to 15 μm.

Requirements with respect to the desired length of the needle-shaped crystals are explained hereinafter. During manufacturing of the needles by the preferred chemical vapor deposition (CVD) technique it has been observed that a slightly amorphous layer deviating from a needle structure is formed in contact with the substrate: this layer, called "nuclei layer", has an average thickness in the range of about 30 μm, depending on the deposition parameters in the CVD process. In order to get a working system showing the most favourable compromise between sensitivity and signal-to-noise ratio it is recommended to provide needles having a length exceeding at least twice the thickness of the amorphous nuclei layer. As a consequence 100 μm is the sub-boundary as smaller needle lengths lack sensitivity and high enough a signal-to-noise value. Further on a needle length of more than 1000 μm is not desired as the intensity of laser light becomes weakened and cannot reach the bottom of the needle. Binderless needle-shaped layers exceeding 1000 μm cannot be read-out and are not contributing to the desired signals, the more as light emitted by stimulated radiation will not be able to escape from a needle-shaped layer having a thickness of more than 1000 μm. In a more preferred embodiment the desired needle-shaped CsBr:Eu phosphor should thus have an average length in the range from 100 μm up to 500 μm.

The walls of the vacuum-deposited cylinders which are acting as microchannels, are arranged in order to reflect the light emitted by the nanophosphors down the microchannel cylinders to a suitable light collecting device such as an electronic device. It is recommended to provide walls having a smooth surface inside the cylindrical coat as light will be conducted better without extreme aberrations or deviations. Besides preferably having a variation coefficient upon average cross-section diameter and average casing length of less than 0.30 for the cylindrically shaped needle phosphors, in favour of efficiency of light throughput and sharpness, it is particularly recommended to have a high conversion efficiency, so that a low amount of X-ray energy is needed (e.g. in the range of less than 100 eV) in order to create a photostimulated light (PSL) centre.

Needle-shaped CsBr:Eu$^{2+}$ storage phosphor particles according to the present invention are preferably coated in a storage phosphor plate or panel according to the present invention in amounts for said storage phosphor particles ranging from 10 mg/cm$^2$ up to 400 mg/cm$^2$.

It is recommended to provide stimulable phosphor walls having a smooth surface inside the cylindrical coating and, in a preferred embodiment, to have the walls of said cylinders dyed or colored with the preferred dye or pigment set forth hereinbefore, absorbing stimulating radiation impinging thereupon.

According to the present invention a layer arrangement in form of a storage phosphor screen or panel is provided, said screen or panel emitting radiation after stimulation of phosphor particles having stored energy from X-rays having impinged upon said screen or panel, said panel comprising a substrate having a planar surface; a multiplicity of cylindrical needle-shaped phosphors extending onto the surface of the substrate, said phosphors being the needle-shaped CsBr:Eu$^{2+}$ storage phosphor particles in form of a cylinder, and a dye providing light-stability and ability to become sublimated during chemical vapor deposition, without loss of spectral absorption characteristics as has been unexpectedly offered by the selected β-Cu phthalocyanine dye.

Besides the dyes advantageously approved in the radiation image storage panel according to the present invention and further in order to provide a stimulable phosphor screen useful in an X-ray recording system with a very good compromise between speed of the recording system (i.e. a patient dose in an amount as low as possible) and an image with high sharpness and low noise, a binderless stimulable phosphor screen has been provided, wherein said screen comprises a vapor deposited phosphor layer on a support absorbing at least 30% of the stimulating light and reflecting at least 60% of the stimulated light, wherein, in a preferred embodiment said support is a polymeric film support (like a polyethylene terephthalate film) colored with pigments (like a white TiO$_2$ pigment and a blue MACROLEX BLUE pigment) as disclosed in EP-Application No. 01 000 697, filed Dec. 3, 2001, the composition of which may advantageously used in the context of the present invention.

In case wherein the binderless stimulable phosphor screen comprises a vapor deposited phosphor layer on a substrate, characterised in that a ceramic layer—preferably applied to said substrate by a thermal spraying technique or, in the alternative, by coating an aqueous dispersion comprising a silicate and said at least one inorganic pigment absorbing stimulating light (preferably a white pigment selected from the group of Al$_2$O$_3$, TiO$_2$, SiO$_2$ and ZnO)—is present between said substrate (preferably being a metal or an alloy selected from the group of aluminium, steel, brass and copper) and said phosphor layer as has been disclosed in EP-Application No. 01 000 696, filed Dec. 3, 2001, analoguous results with respect to speed and sharpness are obtained if applied within the context of dyed layers in the layer arrangement according to the present invention.

A subbing layer is, in favour of adhesion of the layers, advantageously present between a substrate, whether or not overcoated with a ceramic layer, and the phosphor layer. Such a subbing layer is coated to said substrate by coating an aqueous dispersion comprising a silicate and at least one pigment or dye, but in favour of antireflective properties and sharpness it is recommended to build-up such a subbing layer with at least one of MgF$_2$, silica (SiO$_2$) and at least one nanocrystalline dye compound(s), wherein the said dye compound is (or compounds are) the preferred dye or dyes cited above and wherein the preferred components provide ability to become vapor deposited, apart or simultaneously. Such a subbing layer has, in a preferred embodiment, a thickness in the range from 100 nm up to 50 μm, without however being restricted thereto.

A particular layer or layer arrangement according to the present invention advantageously makes use of a substrate selected from the group consisting of glass, polyethylene therephthalate, polyethylene naphthalate, polycarbonate, aluminum, Pyrex® (fused silicate glass), polymethylacrylate, polymethylmethacrylate, sapphire, zinc selenide, Zerodur® (glass ceramic), a ceramic layer and a metal or an alloy selected from the group of aluminum, steel, brass and copper. The recited substrate materials are thus selected from the classes of glass, polymers, ceramics and metals.

Although having an enhanced strength by presence of the selected dye the binderless phosphor layer in the layer arrangement in form of a flat radiation image storage panel for computed radiography, it is recommended to apply a protective layer on top of the needle-shaped phosphor layer in order to further enhance the strength of the said phosphor layer.

Presence of a strong protective layer indeed provides ease of transport through a scanning module without causing jamming as has been disclosed in EP-Application Nos. 01 000 694 and 01 000 695, both filed Dec. 3, 2001, said protective layer, whether or not filling small voids in the phosphor layers, comprises at least 1 mole % of moieties carrying fluor-atoms, and even more preferably between 5 mole % and 50 mole %. In favour of transport the binderless stimulable phosphor screen accordingly has a protective layer further comprising polymeric beads with a volume median diameter, $d_{v50}$, so that 5 $\mu m \leq dv50 \leq 25$ $\mu m$ and a numeric median diameter, $d_{n50}$, so that $1 \leq d_{v50}/d_{n50} \leq 1.20$. In a further preferred embodiment, in favour of the same objects to be obtained the said protective layer has a thickness, t, so that 1 $\mu m \leq t \leq 10$ $\mu m$ and said polymeric beads have a volume median diameter, $d_{v50}$, so that $1.25 \leq d_{v50}/t \leq 4.0$. Radiation curing of said protective layer is highly recommended.

According to the present invention a layer arrangement is provided wherein a binderless photostimulable phosphor screen is overcoated with a protective layer comprising besides moieties carrying fluor-atoms, polymeric beads or at least one nanocrystalline dye compound or a combination thereof.

In order to provide an image storage panel having high surface durability, i.a. avoiding damaging of the surface by stain and abrasion after multiple use, further in favour of ease of manipulation, excellent image quality (improved sharpness) without screen structure noise (graininess) increase the radiation image storage panel comprises a protective coating characterized in that, besides a binder, the said protective coating comprises a white pigment having a refractive index of more than 1.6, more preferably a refractive index of more than 2.0, and even more defined, titanium dioxide, which is present in the said binder, optionally further comprising a urethane acrylate, and wherein said protective coating has a surface roughness (Rz) between 2 $\mu m$ and 10 $\mu m$ as disclosed in EP-Application No. 01 000 711, filed Dec. 5, 2001.

In the alternative the protective layer is composed of a polymeric compound selected from the group consisting of vinyl resins comprising moieties derived from esters of acrylic acid and vinyl resins comprising moieties derived from esters of methacrylic acid and, even more preferably, a thermoplastic rubber as disclosed in EP-Application No. 02 100 235, filed Mar. 8, 2002. In favour of sharpness the polymer further comprises at least one colorant, and more preferably, a colorant having same absorption characterstics with respect to stimulating radiation as the colorant deposited by chemical vapor deposition as described above.

In still another embodiment according to the present invention a layer arrangement is provided wherein a binderless photostimulable phosphor screen is overcoated with a vacuum deposited protective layer of poly(p-xylylene), poly(p-2-chloroxylylene), poly(p-2,6-dichloroxyly-lene), fluoro substituted poly(p-xyly-lene), $MgF_2$, or a combination thereof. Poly(p-xylylene) is also known as, or called "parylene". As chemical vapor deposition is a technique that can be applied when making use of those components, the said technique is advantageously applied in this case. "Parylene" thereby particularly provides excellent moisture resistance, whereas $MgF_2$ offers excellent anti-reflecting properties. The moisture-protecting "parylene" layer is, in a particular embodiment colored with the same colorant as the needle-shaped phosphor layer, as such a layer is easily obtained by simultaneous deposition of the vacuum deposited protective layer and the colorant.

The present invention, in a particularly preferred embodiment of its layer arrangement, moreover includes a binderless phosphor panel comprising, besides a nanocrystalline dye compound, in at least one layer on the substrate or support (representative for the gist of the present invention) a vapor deposited storage or stimulable phosphor, more preferably a needle-shaped phosphor, and even most preferably a CsX:Eu phosphor, wherein X represents a halide selected from the group consisting of Br and Cl, forming a binderless phosphor layer on said support; a protective layer according to the embodiments set forth hereinbefore.

A moisture-proof insulating film is thus present, wherein said film is obtained by CVD (chemical vapor deposition) formed on the phosphor screen or panel as most preferred embodiment of the layer arrangement of the present invention. The phosphor screen or panel thus formed characterized by a moistureproof protective overcoat layer, preferably has that protective layer on part of the support having a surface larger than the main surface of said phosphor layer, so that the said phosphor layer leaves a portion of said support free, and said protective overcoat layer covers at least a part of said portion of said support left free by said phosphor layer. Said moistureproof protective overcoat layer normally is the outermost layer, covering the surface of the phosphor layer, wherein the said surface is smaller than the surface of the support so that the phosphor layer does not reach the edges of the support. A panel with a support having a surface larger than the main surface of the phosphor layer leaves a portion of the support free, whereas the moistureproof protective layer covers, at least in part, the portion of the support left free by the phosphor layer. An advantage of such a construction resides in the fact that the edges of the phosphor layer do not touch mechanical parts of the apparatus and are thus less easily damaged during use of the panel, more particularly e.g. during transport in a scanner. Another advantage of this construction is that no special edge reinforcement is necessary (although, if desired, further edge reinforcement may be applied). Such a construction of a phosphor panel wherein the surface of the phosphor layer is smaller than the surface of the support, so that the phosphor layer does not reach the edges of the support, represents a particularly preferred embodiment of the present invention, and such a construction can be beneficial for the manufacture of any phosphor panel covered with any protective layer known in the art. In such a phosphor panel the moistureproof protective layer normally has a thickness in the range between 0.05 $\mu m$ and 15 $\mu m$, and even more preferably between 1 $\mu m$ and 10 $\mu m$.

As suggested hereinbefore the moistureproof protective overcoat layer normally is the outermost layer of the panel but, in another embodiment, the said layer may be further overcoated with another outermost layer for further protection, e.g. against dust, scratches and damaging. In that case it is recommended to have a polymeric layer and, even more preferred a radiation cured polymeric layer as an outermost layer. When on such a phosphor layer with needle shaped phosphor crystals, separated by voids, a layer with very low water permeability is deposited as in the present invention, it is preferred that this layer is a chemical vacuum deposited parylene layer, while such a layer not only covers the surface of the needle crystals, but also covers, at least in part besides the already present selected colorant disclosed hereinbefore, the voids between the needles, thus protecting the edges of the phosphor needles thoroughly against humidity.

In a preferred embodiment according to the present invention a layer arrangement is provided, wherein a binderless photostimulable phosphor screen is coated on the said a substrate, wherein said substrate is in contact with a Fibre Optic Plate (FOP).

Use can further be made of the same method for obtaining an electrical representation of a radiation image by means of (a) CCD sensor(s), therein guiding the stimulated light from the phosphor plate portion to at least one two-dimensional CCD sensor kept in a static position relative to the phosphor plate portion as disclosed in EP-A 0 859 244, without however being limited thereto. Moreover a device for reading out information stored in a phosphor carrier and to an X-ray cassette which contains the phosphor carrier and such a device is advantageously used, said device additionally having a receiving means which contains a number of point elements in order to receive radiation emitted from the phosphor carrier in a point-by-point manner as e.g. described in EP-A 1 034 443, without being limited thereto.

An information reading device for data stored in phosphor coating, having a radiation source for transmitting stimulation radiation, and a receiver for radiation emitted from the phosphor coating; wherein the radiation source is arranged on one side of the carrier material and the receiver on the other side and wherein a radiation path is formed between source and receiver as in EP-A 1 014 684 is further advantageously used.

While the present invention will hereinafter be described in connection with preferred embodiments thereof, it will be understood that it is not intended to limit the invention to those embodiments.

A well known use of storage phosphors is in the production of X-ray images. In U.S. Pat. No. 3,859,527 a method for producing X-ray images with a photostimulable phosphor, which are incorporated in a panel is disclosed. The panel is exposed to incident pattern-wise modulated X-ray beam and as a result thereof the phosphor temporarily stores energy contained in the X-ray radiation pattern. At some interval after the exposure, a beam of visible or infra-red light scans the panel to stimulate the release of stored energy as light that is detected and converted to sequential electrical signals which are processed to produce a visible image. For this purpose, the phosphor should store as much as possible of the incident X-ray energy and emit as little as possible of the stored energy until stimulated by the scanning beam. This is called "digital radiography" or "computed radiography".

The image quality that is produced by any radiographic system using a phosphor screen thus also by a digital radiographic system, depends largely on the construction of the phosphor screen. Generally, the thinner a phosphor screen at a given amount of absorption of X-rays, the better the image quality will be. This means that the lower the ratio of binder to phosphor of a phosphor screen, the better the image quality, attainable with that screen, will be. Optimum sharpness can thus be obtained when screens without any binder are used. Such screens can be produced, e.g., by physical vapour deposition, which may be thermal vapour deposition, sputtering, electron beam deposition or other of phosphor material on a substrate. However, this production method can not be used to produce high quality screens with every arbitrary phosphor available. The mentioned production method leads to the best results when phosphor crystals with high crystal symmetry and simple chemical composition are used.

The use of alkali metal halide phosphors in storage screens or panels is well known in the art of storage phosphor radiology and the high crystal symmetry of these phosphors makes it possible to provide structured screens and binderless screens.

It has been disclosed that when binderless screens with an alkali halide phosphors are produced it is beneficial to have the phosphor crystal deposited as some kind of piles, needles, tiles, etc. In, e.g., U.S. Pat. No. 4,769,549 it is disclosed that the image quality of a binderless phosphor screen can be improved when the phosphor layer has a block structure shaped in fine pillars. In e.g. U.S. Pat. No. 5,055,681 a storage phosphor screen comprising an alkali halide phosphor in a pile-like structure is disclosed. The image quality of such screens needs still to be increased and in JP-A-06/230 198 it is disclosed that the surface of the screen with pillar like phosphors is rough and that a levelling of that surface can increase the sharpness. In U.S. Pat. No. 5,874,744 the attention is drawn to the index of refractivity of the phosphor used to produce the storage phosphor screen with needle-like or pillar-like phosphor.

Although all screens disclosed in this prior art can yield X-ray images with good quality, the need for a better compromise between speed of the recording system (i.e. as low as possible patient dose) with an image with high sharpness and low noise is still there.

It is an object of the invention to provide a stimulable phosphor screen useful in an X-ray recording system with a very good compromise between speed of the recording system (i.e. as low as possible patient dose) with an image with high sharpness and low noise.

The above mentioned object is realised by providing a stimulable phosphor screen having the specific features defined herein.

Further advantages and embodiments of the present invention will become apparent from the following description and drawings.

It has now been found that it is possible to improve a binderless phosphor screen comprising an alkali halide phosphor by producing it in such a manner that the phosphor is present on the support as needle-like crystals having a specific crystal orientation. It has been found that, when a phosphor screen showing high [100] unit cell orientation in the plane of the screen was produced, that such a screen shows a better compromise between speed and sharpness. The phosphor screens showing high (100) unit cell orientation in the plane of said screen are characterised by an XRD-spectrum wherein the intensity of the (100) diffraction line is at least equal to the intensity of the (110) diffraction line, when said XRD-spectrum is measured by positioning an X-ray source and an X-ray diffraction intensity detector at equal but varying angles with respect to the normal to said screen. Preferably the intensity of the (100) diffraction line is at least 5 times higher than the intensity of the (110) diffraction line and most preferably the intensity of the (100) diffraction line is at least 10 times higher than the intensity of the (110) diffraction line.

To realise such a crystal orientation on the screen the binderless phosphor layer is applied to the support a by method selected from the group consisting of physical vapour deposition, thermal vapour deposition, chemical vapour deposition, electron beam deposition, radio frequency deposition and pulsed laser deposition. In fact any of the methods above for preparing the binderless phosphor screen is suitable as long as the parameters of the method can be adjusted so that the requirements of the crystallinity of the phosphor needles as described herein above are met. Preferably the binderless phosphor screen is prepared by vacuum deposition under an inert gas atmosphere. It was found that by adjusting the temperature of the substrate and the pressure of the inert gas during vacuum deposition, the crystal orientation of the needles could be adjusted to the desired level.

The inert gas that is used during vapour deposition is preferably Ar. The temperature of the gas stream that enters the vacuum deposition apparatus is kept between 0° C. and 100° C. Preferably the gas stream is kept at room temperature, i.e., between about 20° C. and about 30° C. The cool gas stream entering the vacuum deposition apparatus can cool both the vapour before it is deposited as well as the substrate. It is preferred to keep said substrate at a temperature, T, so that 50° C.$\leq$T$\leq$300° C., preferably 90° C.$\leq$T$\leq$200° C. The Ar-pressure is at most 10 Pa, preferably kept between 1 Pa and 3 Pa, both limits included. In a more preferred embodiment the Ar-pressure is kept between 0.20 and 2.00 Pa and the temperature is adjusted so that the product between temperature in degrees Celsius and Ar-pressure in Pa is between 20 and 350.

It was found that when a phosphor screen was prepared under the circumstances set out above not only the crystal orientation of the needles could be adjusted to the desired level, but also the macroscopic dimensions of the needles could be influenced: when a method described above was used, very thin needles were obtained. This was especially so when the rate of vapour deposition of the phosphor or phosphor precursors was above 1 mg/cm$^2$min.

Figure 7:
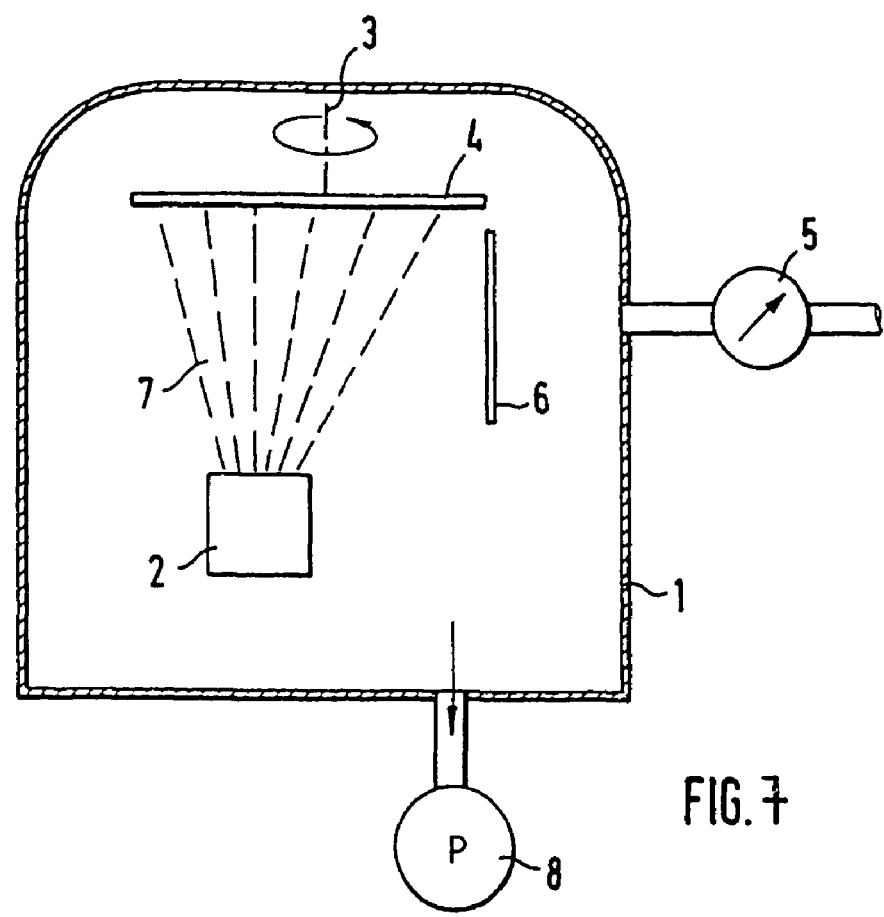
FIG. 7 shows a schematic view of a vapour deposition apparatus useful for producing a binderless storage phosphor screen.

FIG. 7 shows a schematic view of a vapour deposition apparatus useful for producing a binderless storage phosphor screen comprising an alkali metal storage phosphor said screen showing an XRD-spectrum with a (100) diffraction line having an intensity $I_{100}$ and a (110) diffraction line having an intensity $I_{110}$, so that $I_{100}/I_{110} \geq 1$, when said XRD-spectrum is measured according to TEST A. Such apparatus comprises a vacuum vessel (1) in which a vapour deposition source (2) is arranged opposite the substrate (4), which preferably rotates about an axis (3) An inert gas, such as argon, which is very much cooler than the vapour temperature of, typically, 65° to 700° C., for example being at room temperature, can be introduced into the vacuum vessel (1) via a regulating valve (5); the inert gas preferably firstly impinges on a baffle plate (6) and is not introduced directly into the vapour jet (7). The inert gas is evacuated up again via a vacuum pump (8), the vacuum pump is set such that a pressure of less than 10 Pa, preferably between 1 Pa and 3 Pa, is produced within the vacuum vessel (1). If so desired, when the cool gas stream is not sufficient for cooling of the substrate, it is possible to couple the substrate (4) to an external cooling device (not shown).

A binderless phosphor screen according to this invention can be prepared by vacuum deposition of the phosphor crystals on the substrate as well as by combining (mixing) the ingredients for the phosphor (phosphor precursors) and then evaporating this mixture so as to have the phosphor formed in situ during evaporation.

The phosphor in a binderless phosphor screen according to this invention can be any alkali metal phosphor known in the art. Suitable phosphors are, e.g., phosphors according to formula I:

$$M^{1+}X.aM^{2+}X'_2BM^{3+}X''_3:cZ$$

wherein:
$M^{1+}$ is at least one member selected from the group consisting of Li, Na, K, Cs and Rb,
$M^{2+}$ is at least one member selected from the group consisting of Be, Mg, Ca, Sr, Ba, Zn, Cd, Cu, Pb and Ni,
$M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga,
Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, Cl, I and $0.1 \leq a \leq 1$, $0.1 \leq b \leq 1$ and $0 \leq c \leq 0.2$. Such phosphors have been disclosed in, e.g., U.S. Pat. No. 5,736,069.

Highly preferred phosphors for use in a binderless phosphor screen of this invention are CsX:Eu stimulable phosphors, wherein X represents a halide selected from the group consisting of Br and Cl prepared by a method comprising the steps of:
mixing said CsX with between 10 and 5 mol % of an Europium compound selected from the group consisting of $EuX'_2$, $EuX'_3$ and EuOX', X' being a member selected from the group consisting of F, Cl, Br and I,
firing said mixture at a temperature above 450° C. cooling said mixture and
recovering the CsX:Eu phosphor.

Most preferably a CsBr:Eu stimulable phosphor, is used prepared by a method comprising the steps of:
mixing said CsX with between $10^{-3}$ and 5 mol % of an Europium compound selected from the group consisting of $EuX'_2$, $EuX'_3$ and EuOX', X' being a member selected from the group consisting of F, Cl, Br and I,
firing said mixture at a temperature above 450° C.
cooling said mixture and
recovering the CsX:Eu phosphor.

The binderless screen can be prepared by bringing the finished phosphor on the support by any method selected from the group consisting of physical vapour deposition, sputtering, thermal vapour deposition, chemical vapour deposition, electron beam deposition, radio frequency deposition and pulsed laser deposition. It is also possible to bring the alkali metal halide and the dopant together and depositing them both on the support in such a way that the alkali metal phosphor is doped during the manufacture of the screen. Thus the invention encompasses a method for manufacturing a phosphor screen containing a CsX:Eu stimulable phosphor, wherein X represents a halide selected from the group consisting of Br and Cl comprising the steps of:
bringing multiple containers of said CsX and an Europium compound selected from the group consisting of $EuX'_2$, $EuX'_3$ and EuOX', X' being a halide selected from the group consisting of F, Cl, Br and I in condition for vapour deposition and
depositing, by a method selected from the group consisting of, thermal vapour deposition, chemical vapour deposition, electron beam deposition, radio frequency deposition and pulsed laser deposition, both said CsX and said Europium compound on a substrate in such a ratio that on said substrate a CsX phosphor, doped with between $10^{-3}$ and 5 mol % of Europium, is formed.

The deposition can proceed from a single container containing a mixture of the starting compounds in the desired proportions. Thus the method encompasses further a method for manufacturing a phosphor screen containing a CsX:Eu stimulable phosphor, wherein X represents a halide selected from the group consisting of Br and Cl comprising the steps of:
- mixing said CsX with between 10 and 5 mol % of an Europium compound selected from the group consisting of $EuX'_2$, $EuX'_3$ and $EuOX'$, X' being a halide selected from the group consisting of F, Cl, Br and I
- bringing said mixture in condition for vapour deposition and
- depositing said mixture on a substrate by a method selected from the group consisting of physical vapour deposition, thermal vapour deposition, chemical vapour deposition, electron beam deposition, radio frequency deposition and pulsed laser deposition.

Support materials useful for binderless storage screens having a phosphor layer with a crystal orientation as per this invention include cardboard, glass, plastic films such as films of cellulose acetate, polyvinyl chloride, polyvinyl acetate, polyacrylonitrile, polystyrene, polyester, polyethylene terephthalate, polyamide, polyimide, cellulose triacetate and polycarbonate; metal sheets such as aluminium foil and aluminium alloy foil; ordinary papers; baryta paper; resin-coated papers; pigment papers containing titanium dioxide or the like; and papers sized with polyvinyl alcohol or the like. A glass or Al-sheet or a thermostable plastic film is preferably employed as the support material.

When a glass support is used the support may comprise a coated layer with a light absorbing compound. This layer can be present on the back side (side where no phosphor is present) or may be present underneath the phosphor. The supports can also comprise subbing layers for having a better adhesion between the phosphor and the support.

The support, when it is a thermostable plastic film may contain a light-absorbing material such as carbon black, or may contain a light-reflecting material such as titanium dioxide or barium sulphate. The former is appropriate for preparing a high-resolution type storage screen, while the latter is appropriate for preparing a high-sensitivity type storage screen.

These supports may have a thickness which may differ depending on the material of the support, and may generally be between 60 µm and 10,000 µm, more preferably between 80 µm and 5,000 µm from the standpoint of handling.

EXAMPLES

Preparation of the Phosphor

CsBr:Eu screens were made via thermal vapour deposition of CsBr and EuOBr. To this aim, CsBr was mixed with EuOBr and placed in a container in a vacuum deposition chamber. The phosphor was deposited on a glass disk with a thickness of 1.5 mm and a diameter of 40 mm. The distance between the container and the substrate was 10 cm. During evaporation, the substrate was rotated at 12 rpm. The container with starting materials was heated to a temperature of 750° C. Before the start of the evaporation, the chamber was evacuated to a pressure of $4.10^{-5}$ mbar. During the evaporation process, Ar was introduced in the chamber. Variables in the deposition process were the substrate temperature and the Ar gas pressure. The different screens were produced under the conditions listed in Table 1. The Eu-concentration in the evaporated screens was measured with X-ray fluorescence and was of the order of 800 ppm. Via Scanning Electron Microscopy (SEM), the morphology of the deposited phosphor layer was determined. All phosphor layers were made up of needle shaped crystals. FIG. 1 shows a SEM view of an example phosphor layer taken perpendicular on an edge of the phosphor layer. It is clear that a needle like structure is present.

TABLE 1

Substrate temperature and Ar gas pressure at the different screen depositions

| Screen | Substrate temperature (° C.) | Ar pressure (Pa) |
|---|---|---|
| Comparative example 1 | 130 | 3.2 |
| Invention Example 1 | 150 | 2.2 |
| Invention Example 2 | 150 | 1.1 |
| Invention Example 3 | 300 | 0 |
| Invention Example 4 | 92 | 2.4 |

Measurement of Crystal Orientation TEST A

Figure 2:
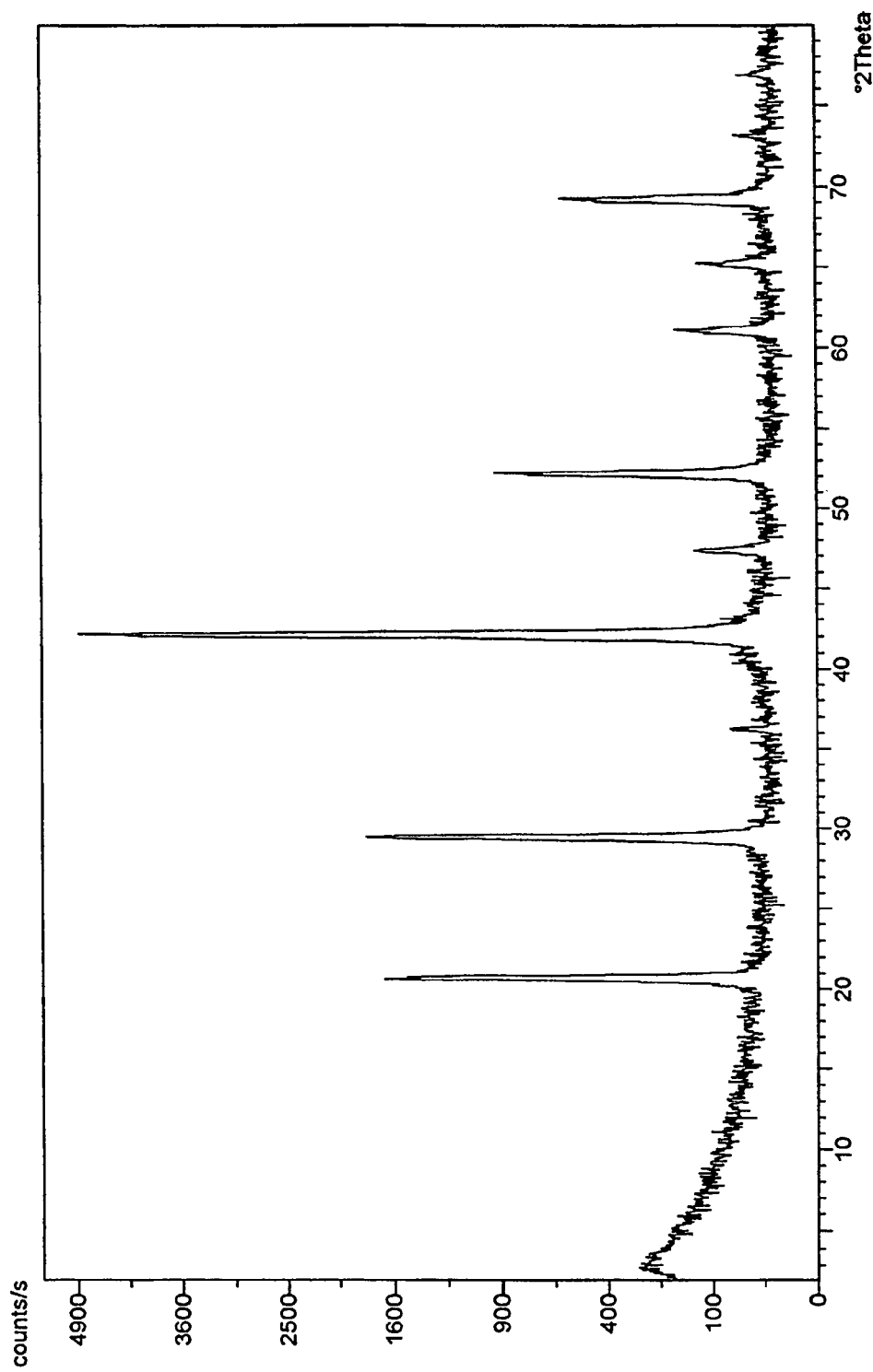
FIG. 2 shows an XRD-spectrum of a screen with a comparative needle-shaped phosphor.
Figure 3:
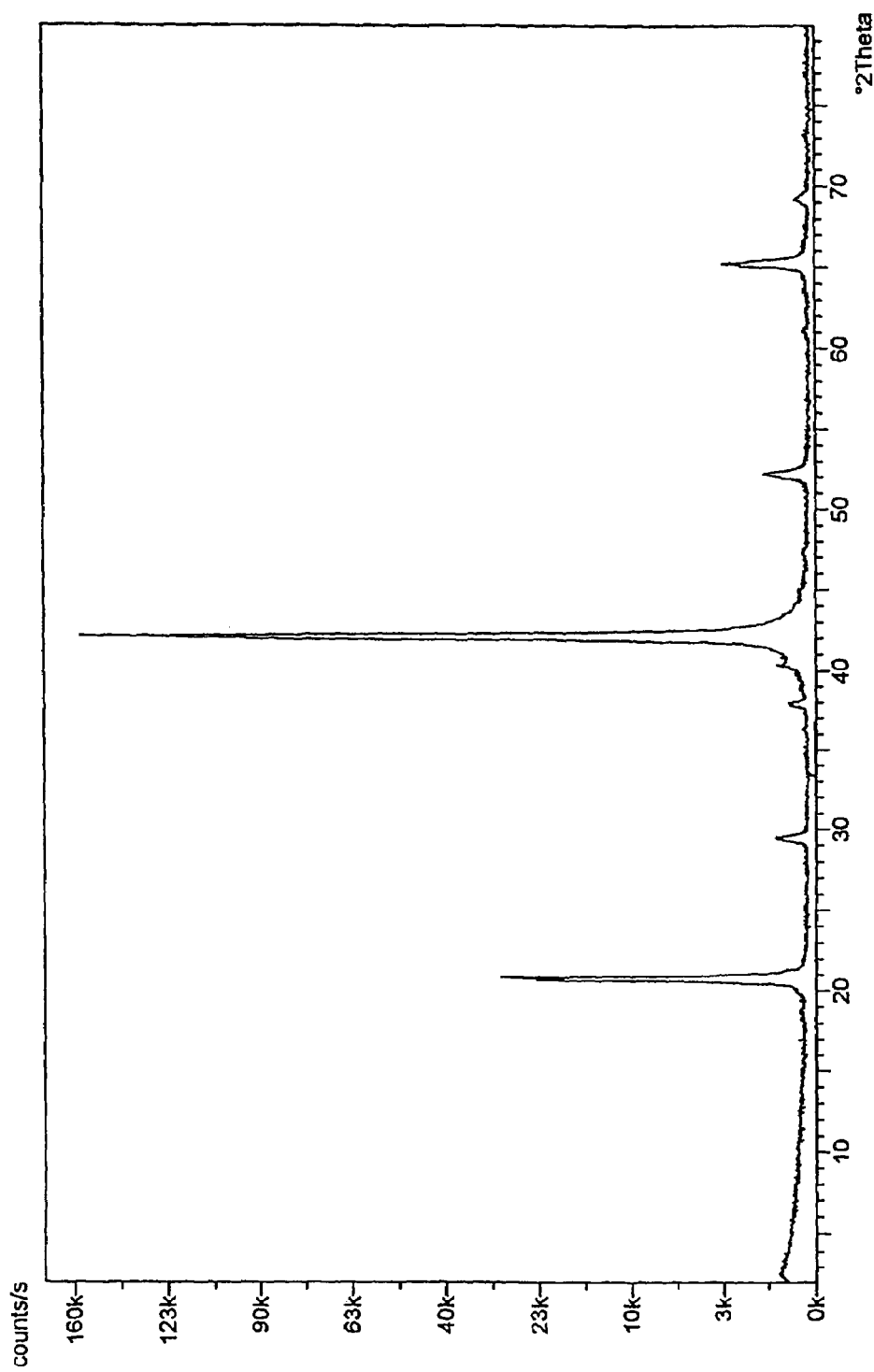
FIGS. 3–6 show XRD spectra of screens with invention needle-shaped phosphors.
Figure 4:
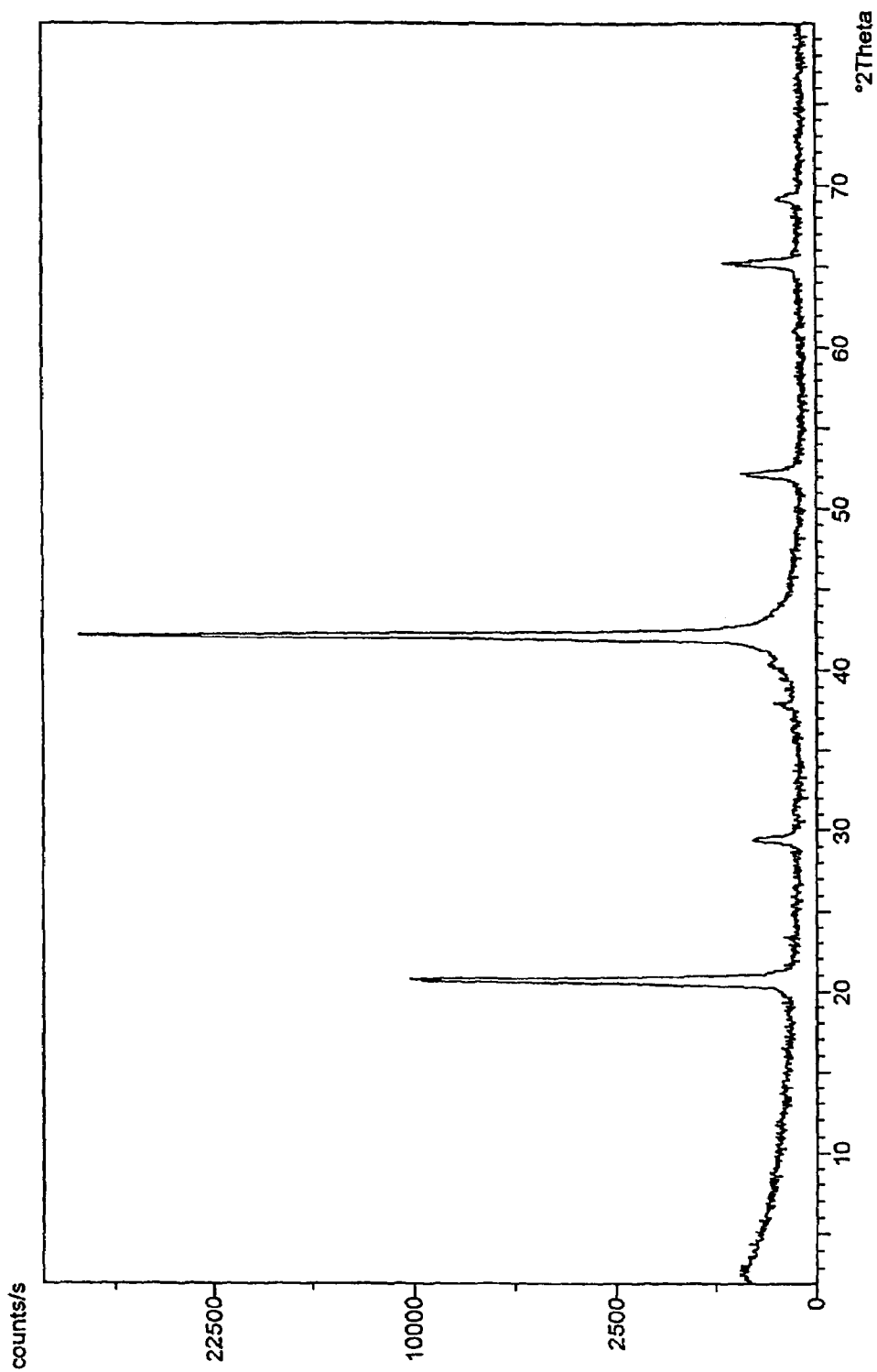
Figure 5:
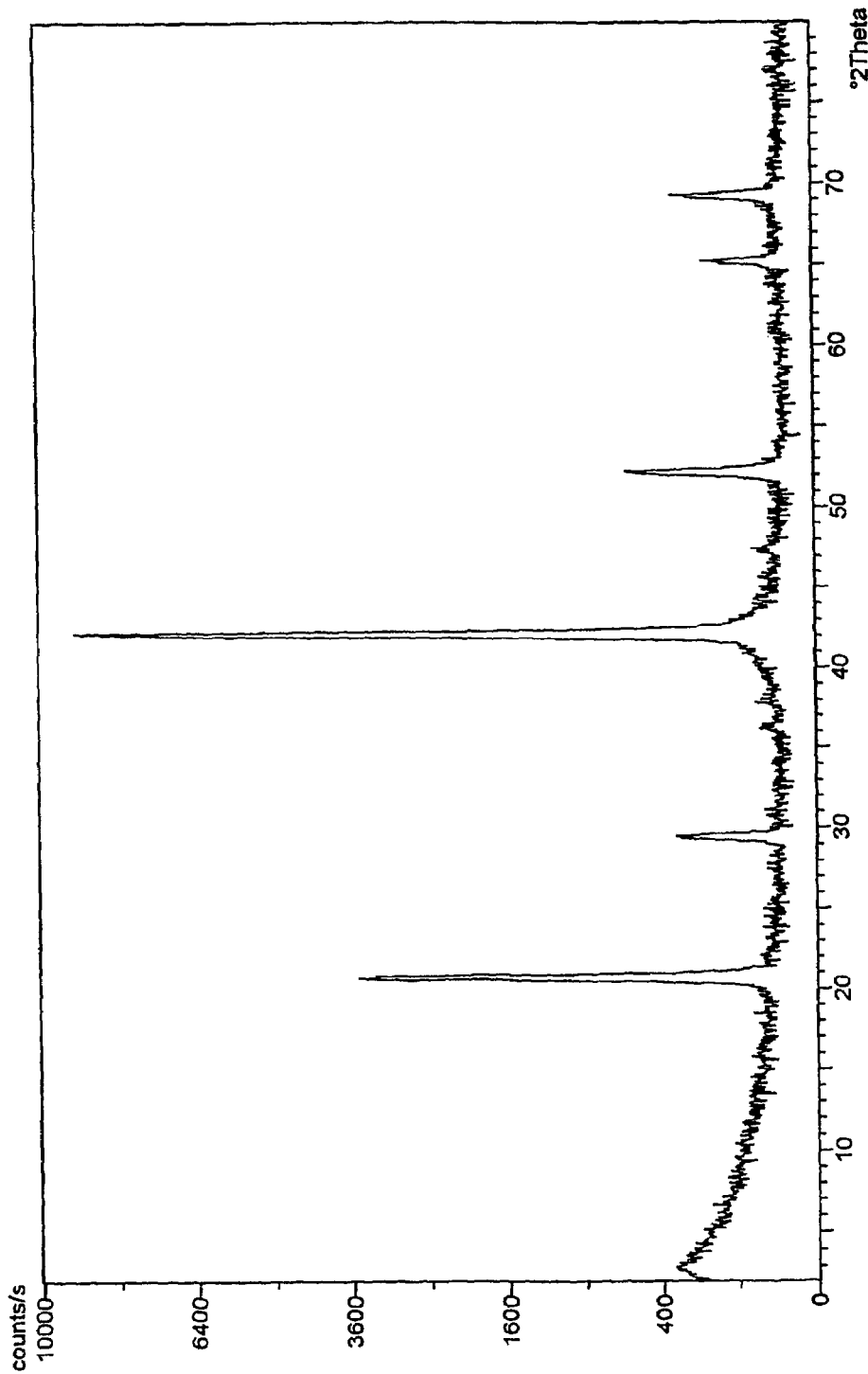
Figure 6:
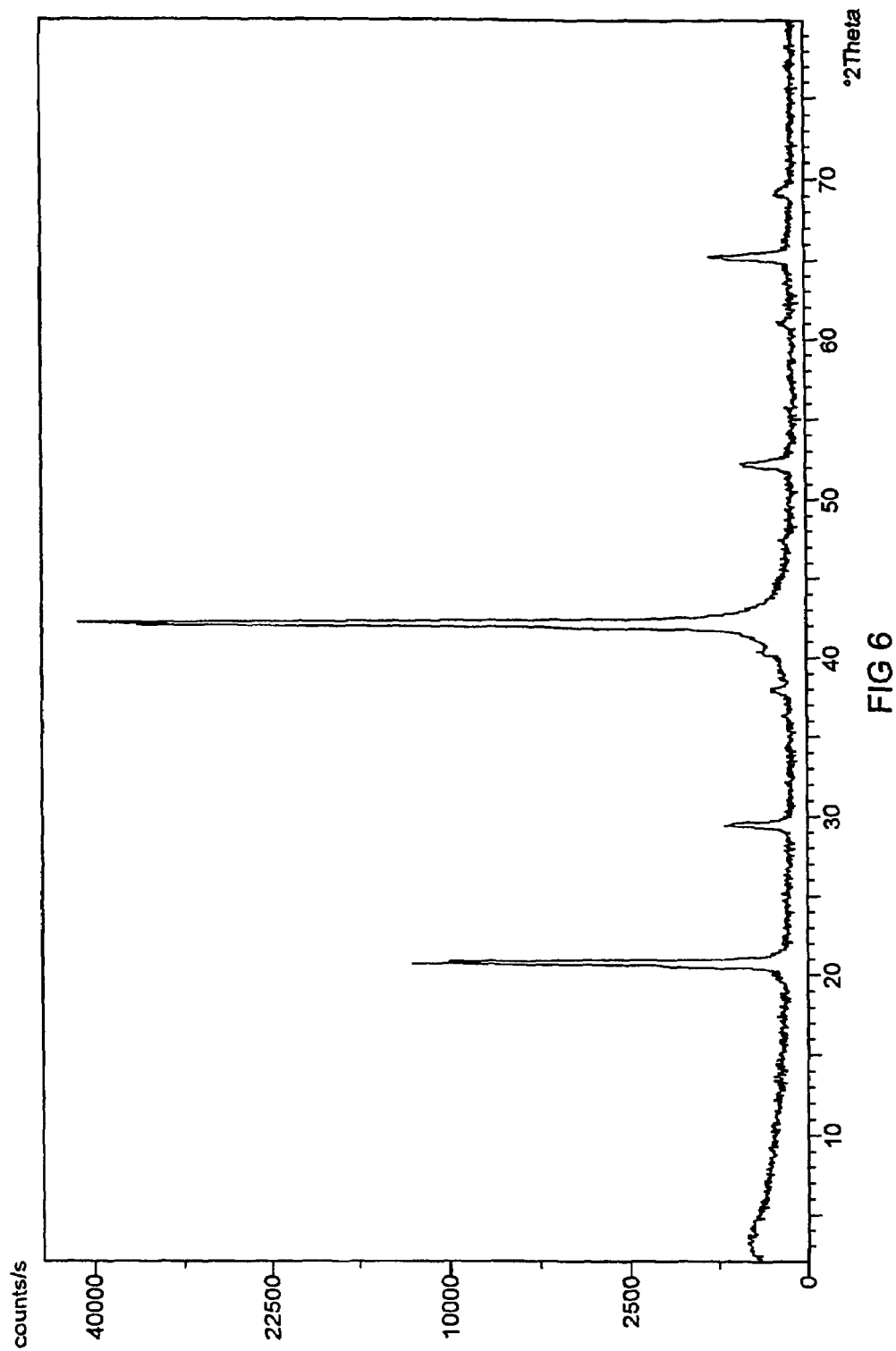

The orientation of the crystal unit cell in the deposited needle shaped crystal has been determined through measurement of the XRD spectrum. XRD spectra have been measured with the commercially available diffractometer. The diffractometer was a Philips X'pert with the a MPPS (Multiple Purpose Sampling Stage) and a Cu tube emitting a Kα-line of 0.154056 nm. The spectra were taken and analysed with the commercial software coming with the diffractometer. The settings and measurement parameters of the measurement were as follows (TEST A):

Settings
  40 kV en 50 mA
  Incident beam: Divergence slit: fixed 1/8°
  Incident beam: Anti scatter slit: fixed 1/4°
  Incident beam: Fixed beam mask: 10 mm Measurement Parameters
  Start 2θ: 2.00°
  End 2θ: 80.00°
  Step size: 0.05°
  Time per step: 0.60 s
  Secondary beam path: lower
  Scan axis: 2θ
  Scan mode: continuous
  Total time: 15 mm 36 s
  Gonjo angle: 2.0°
  Spinning: no FIG. 2 shows the XRD spectrum of comparative example 1. A fairly strong [100] diffraction line is shown at 2θ of about 21° and an evenly strong [110] diffraction line is shown at 2θ of about 29°, also a strong [200] diffraction line is shown at 2θ of about 42°.

FIGS. 3 to 6 show the XRD-spectra of respectively invention example 1, 2, 3 and 4. In these spectra the [110] diffraction line at 2θ of about 29° is barely visible, while the [100] diffraction line at 2θ of about 21° and the [200] diffraction line at 2θ of about 42° remain very strong.

For each of the screens, the ratio between the intensity of the [100] peak in the XRD-spectrum and the [110] peak was calculated. The results are given in table 2

TABLE 2

| Screen | Ratio [100]/[110] |
|---|---|
| Comparative example 1 | 0.79 |
| Invention Example 1 | 54.71 |
| Invention Example 2 | 52.65 |

TABLE 2-continued

| Screen | Ratio [100]/[110] |
|---|---|
| Invention Example 3 | 12.16 |
| Invention Example 4 | 14.05 |

Sensitivity and Sharpness Measurements

In a first measurement the sensitivity (speed) of the phosphor screens, prepared under the conditions given in Table 1 was measured.

The screens were homogeneously irradiated with a dose of c. 50 mR at 80 kVp. Read out was done in a flying spot scanner. In the scanner, the scanning light source was a 30 mW diode laser emitting at 690 nm. A 4-mm BG-39 (trade name of Hoya) filter was used to separate the stimulation light from the screen emission light. The scan-average levels (SAL's) were determined as the average signal produced by the screens in the photomultiplier tube.

In a second measurement, the sharpness of the images, produced by the screens was measured. As a measure for the sharpness, the square wave response at 2 lp/mm was determined.

A grid with line paris at spatial frequencies of 0.025 to 3 lp/mm was placed on top of the cassette, containing the screens. The grid was imaged at 80 kvp and 5 mA during 30". The screens were scanned with the flying spot scanner described above. The signal modulation was determined at 0.025 lp/mm and at 2 lp/mm The SWR at 2 lp/mm was calculated as the ration of the signal modulation at 2 lp/mm to the signal modulation at 0.025 lp/mm. The results of the measurements are listed in Table 3. Wherein the speed of the comparative example screen is arbitrary set to 100.

TABLE 3

| Screen | Speed (arbitrary units) | SWR at 2 Screen lp/mm |
|---|---|---|
| Comparative example 1 | 100 | 0.50 |
| Invention Example 1 | 186 | 0.56 |
| Invention Example 2 | 214 | 0.59 |
| Invention Example 3 | 102 | 0.66 |
| Invention Example 4 | 156 | 0.53 |

It can be concluded that the comparative example 1 screen with less developed (100) unit cell orientation, has inferior quality with respect to the invention examples 1–4 with almost perfect (100) unit cell orientation. It is possible to adjust the orientation of the crystal to choose a desired speed/sharpness compromise by using the temperature of the substrate during the vacuum deposition and the pressure of the inert gas as parameters.

EXAMPLES

The factor called "separatory factor" has been defined as a ratio of densities measured at two differing wavelengths. The factor is not depending on the layer thickness of the filter, nor is it depending on the concentration of the dye or colorant. One wavelength has been chosen where a strong absorption by the filter is required (in this case at a wavelength of 685 nm, corresponding with the maximum wavelength of the stimulating light), whereas the other wavelength has been chosen at a wavelength in order to provide an optimized transmission (in this case at 440 nm wavelength where a maximum is measured for the emission spectrum of the phosphor upon stimulation).

At those "optimized wavelengths" the "separatory factor" for that specific dye or colorant, provides the highest value as, according to the objects one wavelength coincides with the maximum absorption wavelength of the stimulating light, whereas the other wavelength coincides with minimum absorption or maximum transition wavelength for radiation emitted by phosphor upon stimulation.

In another embodiment according to the present invention a method was offered in order to incorporate a dye or pigment in a needle-shaped image phosphor plate, after having been dipped in an alcoholic solution wherein the pigments or dyes have been dissolved, whereafter the said phosphor plate was dried in air in order to evaporate the alcohol present, and in order to immobilize the dye in the phosphor plate. The binder was present in the alcoholic dye solution used in the said method, in low amounts from 1% up to 10% by weight. Presence of a dye avoided light transfer from one needle to another (neighbouring) needle and enhanced the advantages effect of the needle structure: this resulted in an even further improved sharpness or image definition, although a slight, but acceptable speed decrease was detected.

Having described in detail preferred embodiments of the current invention, it will now be apparent to those skilled in the art that numerous modifications can be made therein without departing from the scope of the invention as defined in the appending claims.

What is claimed is:

1. A layer arrangement on a substrate wherein at least one nanocrystalline dye compound is present in at least one binderless photostimulable phosphor layer on said substrate wherein said dye compound is β-Cu-phthalocyanine.

2. A layer arrangement according to claim 1, wherein said layer having at least one nanocrystalline dye compound further comprises colloidal silica.

3. Layer arrangement according to claim 2, representing a photostimulable phosphor screen having a support and a binderless vapor deposited photostimulable phosphor layer with phosphor needles and voids between said needles, wherein said voids between said needles are partially filled with said nanocrystalline dye.

4. Layer arrangement according to claim 3, wherein said photostimulable phosphor layer is composed of a vapor deposited alkali metal halide phosphor.

5. Layer arrangement according to claim 4, wherein said photostimulable phosphor layer comprises a needle-shaped CsX:Eu phosphor, wherein X represents a halide selected from the group consisting of Br and Cl.

6. Layer arrangement according to claim 5, wherein said layer arrangement is overcoated with a vacuum deposited protective layer of poly(p-xylylene), poly(p-2-chloroxylylene), poly(p-2,6-dichloroxyly-lene), fluoro substituted poly(p-xyly-lene), $MgF_2$, or a combination thereof.

7. Layer arrangement according to claim 5, wherein said layer arrangement is coated on said substrate, wherein said substrate is in contact with a Fibre Optic Plate (FOP).

8. A layer arrangement according to claim 5, wherein said substrate is selected from the group consisting of glass, polyethylene therephthalate, polyethylene naphthalate, polycarbonate, fused silicate glass, polymethylacrylate, polymethylmethacrylate, sapphire, zinc selenide, glass ceramic, a ceramic layer and a metal or an alloy selected from the group of aluminum, steel, brass and copper.

9. Layer arrangement according to claim 3, wherein said binderless photostimulable phosphor layer is overcoated with a protective layer comprising at least one of moieties carrying fluor-atoms, polymeric beads or nanocrystalline dye compound.

10. Layer arrangement according to claim 3, wherein said layer arrangement is overcoated with a vacuum deposited protective layer of poly(p-xylylene), poly(p-2-chloroxylylene), poly(p-2,6-dichloroxyly-lene), fluoro substituted poly(p-xyly-lene), MgF$_2$, or a combination thereof.

11. Layer arrangement according to claim 3, wherein said layer arrangement is coated on said substrate, wherein said substrate is in contact with a Fibre Optic Plate (FOP).

12. A layer arrangement according to claim 3, wherein said substrate is selected from the group consisting of glass, polyethylene therephthalate, polyethylene naphthalate, polycarbonate, fused silicate glass, polymethylacrylate, polymethylmethacrylate, sapphire, zinc selenide, glass ceramic, a ceramic layer and a metal or an alloy selected from the group of aluminum, steel, brass and copper.

13. Layer arrangement according to claim 2, wherein said photostimulable phosphor layer is composed of a vapor deposited alkali metal halide phosphor.

14. Layer arrangement according to claim 13, wherein said photostimulable phosphor layer comprises a needle-shaped CsX:Eu phosphor, wherein X represents a halide selected from the group consisting of Br and Cl.

15. Layer arrangement according to claim 14, wherein said binderless photostimulable phosphor layer is overcoated with a protective layer comprising at least one of moieties carrying fluor-atoms, polymeric beads or nanocrystalline dye compound.

16. Layer arrangement according to claim 14, wherein said layer arrangement is overcoated with a vacuum deposited protective layer of poly(p-xylylene), poly(p-2-chloroxylylene), poly(p-2,6-dichloroxyly-lene), fluoro substituted poly(p-xyly-lene), MgF$_2$, or a combination thereof.

17. Layer arrangement according to claim 14, wherein said layer arrangement is coated on said substrate, wherein said substrate is in contact with a Fibre Optic Plate (FOP).

18. A layer arrangement according to claim 14, wherein said substrate is selected from the group consisting of glass, polyethylene therephthalate, polyethylene naphthalate, polycarbonate, fused silicate glass, polymethylacrylate, polymethylmethacrylate, sapphire, zinc selenide, glass ceramic, a ceramic layer and a metal or an alloy selected from the group of aluminum, steel, brass and copper.

19. Layer arrangement according to claim 2, wherein said layer arrangement is overcoated with a vacuum deposited protective layer of poly(p-xylylene), poly(p-2-chloroxylylene), poly(p-2,6-dichloroxyly-lene), fluoro substituted poly(p-xyly-lene), MgF$_2$, or a combination thereof.

20. Layer arrangement according to claim 2, wherein said layer arrangement is coated on said substrate, wherein said substrate is in contact with a Fibre Optic Plate (FOP).

21. A layer arrangement according to claim 2, wherein said substrate is selected from the group consisting of glass, polyethylene therephthalate, polyethylene naphthalate, polycarbonate, fused silicate glass, polymethylacrylate, polymethylmethacrylate, sapphire, zinc selenide, glass ceramic, a ceramic layer and a metal or an alloy selected from the group of aluminum, steel, brass and copper.

22. Layer arrangement according to claim 1, representing a photostimulable phosphor screen having a support and a binderless vapor deposited photostimulable phosphor layer with phosphor needles and voids between said needles, wherein said voids between said needles are partially filled with said nanocrystalline dye.

23. Layer arrangement according to claim 22, wherein said photostimulable phosphor layer is composed of a vapor deposited alkali metal halide phosphor.

24. Layer arrangement according to claim 23, wherein said photostimulable phosphor layer comprises a needle-shaped CsX:Eu phosphor, wherein X represents a halide selected from the group consisting of Br and Cl.

25. Layer arrangement according to claim 24, wherein said binderless photostimulable phosphor layer is overcoated with a protective layer comprising at least one of moieties carrying fluor-atoms, polymeric beads or nanocrystalline dye compound.

26. Layer arrangement according to claim 24, wherein said layer arrangement is overcoated with a vacuum deposited protective layer of poly(p-xylylene), poly(p-2-chloroxylylene), poly(p-2,6-dichloroxyly-lene), fluoro substituted poly(p-xyly-lene), MgF$_2$, or a combination thereof.

27. Layer arrangement according to claim 24, wherein said layer arrangement is coated on said substrate, wherein said substrate is in contact with a Fibre Optic Plate (FOP).

28. A layer arrangement according to claim 24, wherein said substrate is selected from the group consisting of glass, polyethylene therephthalate, polyethylene naphthalate, polycarbonate, fused silicate glass, polymethylacrylate, polymethylmethacrylate, sapphire, zinc selenide, glass ceramic, a ceramic layer and a metal or an alloy selected from the group of aluminum, steel, brass and copper.

29. Layer arrangement according to claim 22, wherein said layer arrangement is overcoated with a vacuum deposited protective layer of poly(p-xylylene), poly(p-2-chloroxylylene), poly(p-2,6-dichloroxyly-lene), fluoro substituted poly(p-xyly-lene), MgF$_2$, or a combination thereof.

30. Layer arrangement according to claim 22, wherein said layer arrangement is coated on said substrate, wherein said substrate is in contact with a Fibre Optic Plate (FOP).

31. A layer arrangement according to claim 22, wherein said substrate is selected from the group consisting of glass, polyethylene therephthalate, polyethylene naphthalate, polycarbonate, fused silicate glass, polymethylacrylate, polymethylmethacrylate, sapphire, zinc selenide, glass ceramic, a ceramic layer and a metal or an alloy selected from the group of aluminum, steel, brass and copper.

32. Layer arrangement according to claim 1, wherein said photostimulable phosphor layer is composed of a vapor deposited alkali metal halide phosphor.

33. Layer arrangement according to claims 32, wherein said photostimulable phosphor layer comprises a needle-shaped CsX:Eu phosphor, wherein X represents a halide selected from the group consisting of Br and Cl.

34. Layer arrangement according to claim 33, wherein said binderless photostimulable phosphor layer is overcoated with a protective layer comprising at least one of moieties carrying fluor-atoms, polymeric beads or nanocrystalline dye compound.

35. Layer arrangement according to claim 33, wherein layer arrangement is overcoated with a vacuum deposited protective layer of poly(p-xylylene), poly(p-2-chloroxylylene), poly(p-2,6-dichloroxyly-lene), fluoro substituted poly(p-xyly-lene), MgF$_2$, or a combination thereof.

36. Layer arrangement according to claim 33, wherein said layer arrangement is coated on said substrate, wherein said substrate is in contact with a Fibre Optic Plate (FOP).

37. A layer arrangement according to claim 33, wherein said substrate is selected from the group consisting of glass, polyethylene therephthalate, polyethylene naphthalate, polycarbonate, fused silicate glass, polymethylacrylate, polymethylmethacrylate, sapphire, zinc selenide, glass ceramic, a ceramic layer and a metal or an alloy selected from the group of aluminum, steel, brass and copper.

38. Layer arrangement according to claim 1, wherein said layer arrangement is overcoated with a vacuum deposited protective layer of poly(p-xylylene), poly(p-2-chloroxylylene), poly(p-2,6-dichloroxyly-lene), fluoro substituted poly(p-xyly-lene), $MgF_2$, or a combination thereof.

39. Layer arrangement according to claim 1, wherein said layer arrangement is coated on said substrate, wherein said substrate is in contact with a Fibre Optic Plate (FOP).

40. A layer arrangement according to claim 1, wherein said substrate is selected from the group consisting of glass, polyethylene therephthalate, polyethylene naphthalate, polycarbonate, fused silicate glass, polymethylacrylate, polymethylmethacrylate, sapphire, zinc selenide, glass ceramic, a ceramic layer and a metal or an alloy selected from the group of aluminum, steel, brass and copper.

* * * * *